(12) United States Patent
Gallagher

(10) Patent No.: US 6,640,037 B2
(45) Date of Patent: Oct. 28, 2003

(54) THIN WALLED CORE BAND-GAP WAVEGUIDES

(75) Inventor: Michael T. Gallagher, Corning, NY (US)

(73) Assignee: Corning Incorporated, Corning, NY (US)

( * ) Notice: Subject to any disclaimer, the term of this patent is extended or adjusted under 35 U.S.C. 154(b) by 71 days.

(21) Appl. No.: 10/085,785

(22) Filed: Feb. 27, 2002

(65) Prior Publication Data

US 2002/0150367 A1 Oct. 17, 2002

Related U.S. Application Data

(60) Provisional application No. 60/284,242, filed on Apr. 17, 2001.

(51) Int. Cl.[7] .......................... G02B 6/20; G02B 37/012
(52) U.S. Cl. ........................ 385/125; 65/393; 65/406; 65/409; 65/408
(58) Field of Search ............................. 385/123–132; 65/385, 393, 403, 406, 408, 412, 429

(56) References Cited

U.S. PATENT DOCUMENTS

| | | | |
|---|---|---|---|
| 6,301,421 B1 | * | 10/2001 | Wickham et al. ............ 385/126 |
| 6,444,133 B1 | * | 9/2002 | Rajardo et al. ................ 216/24 |
| 2002/0136516 A1 | * | 9/2002 | Allan et al. .................. 385/125 |

FOREIGN PATENT DOCUMENTS

| WO | WO 9964903 A | 12/1999 | ............ G02B/6/00 |
|---|---|---|---|
| WO | WO 0060388 | 10/2000 | ............ G02B/6/12 |

OTHER PUBLICATIONS

Cregan et al., "Single–Mode Photonic Band Gap Guidance of Light in Air", Science, American Association for the Advancement of Science, US, vol. 285, NR. 5433, pp. 1537–1539 (Sep. 3, 1999).

Barkou et al., "Silica–Air Photonic Crystal Fiber Design that Permits Waveguiding by a True Photonic Bandgap Effect", Optics Letters, Optical Society of America, Washington, US, vol. 24, No. 1, 1999, pp. 46–48.

* cited by examiner

*Primary Examiner*—Brian Healy
*Assistant Examiner*—Kevin S Wood
(74) *Attorney, Agent, or Firm*—William J. Chervenak

(57) ABSTRACT

Disclosed is a method of making a photonic crystal preform which provides improved properties of the photonic band-gap crystal waveguide fiber drawn therefrom. The photonic crystal preform defect is formed using materials having a particular shape or composition so that the defect walls are preferentially etched away to provide a photonic band-gap crystal waveguide fiber having a smooth walled defect.

14 Claims, 3 Drawing Sheets

THIN WALLED CORE BAND-GAP WAVEGUIDES

This application claims the benefit of and priority to U.S. Provisional Patent Application No. 60/284,242 filed Apr. 17, 2001.

BACKGROUND OF THE INVENTION

1. Field of the Invention

The present invention relates generally to a method of making a photonic crystal preform, having a defect, from which a photonic band-gap crystal waveguide fiber can be drawn, and particularly to a method of forming the defect of the photonic crystal preform.

2. Technical Background

Optical waveguides that guide light by the principle of total internal reflection have been in commercial use for more than two decades. Although optical waveguides of this design represent a quantum step forward in the field of telecommunication, work on alternative waveguide fiber designs continues. A particular drawback of the total internal reflection mechanism is that it acts to confine the light to a higher index portion, that is, the core, of the waveguide fiber. The higher index core is typically higher in density and so is characterized by higher attenuation due to Rayleigh scattering and by a higher non-linear coefficient. The deleterious non-linear effects can be mitigated by designing total internal reflection waveguides that have relatively high effective area. However, the complexity of the core refractive index profile usually increases for designs that provide larger effective area. This complexity usually translates into higher cost.

More recently, diffraction has been studied as a means to guide light in a material. In a light guiding protocol in which the confinement mechanism is diffraction, the material in which the light is guided, i.e., the core of the optical waveguide, can have a relatively low refractive index and thus a lower density. In fact, the use of a gas or a vacuum as a waveguide core becomes practical.

A particular structure well suited for use as a diffraction type optical waveguide is a photonic band-gap crystal. The photonic crystal itself is a regular lattice of features in which the spacing of the features is of the order of the light wavelength to be guided. The photonic crystal can be constructed of a first material having a first refractive index. Embedded in this first material, in the form of a regular lattice or array, is a second material having a second refractive index. This is the basic photonic crystal structure. Variations on this basic design can include more than two materials in the make up of the photonic band-gap crystal. The number of useful variations in the details of the lattice structure is also large.

In the basic photonic crystal structure, the "second material" can simply be pores or voids formed in the first material. That is, the voids serve as the second material in a photonic crystal. Depending upon the refractive index difference of the materials and the spatial arrangement and pitch (center to center distance between features) of the embedded features, the photonic crystal will not propagate light having a wavelength within a certain wavelength band. This is the "band-gap" of the photonic crystal and is the property of the photonic crystal that provides for light confinement. It is due to this property that the structure is given the name, photonic band-gap crystal.

To form an optical waveguide (or more generally, a structure that guides electromagnetic energy), a defect is formed in the photonic band-gap crystal. The defect is a discontinuity in the lattice structure and can be a change in pitch of the lattice, the replacement of a portion of the lattice by a material of different refractive index, or the removal of a portion of the photonic band-gap crystal material. The shape and size of the defect are selected to produce, that is, support, one or more modes of light propagation having respective wavelengths within the band-gap of the photonic crystal. The walls of the defect are thus made of a material, a photonic band-gap crystal, which will not propagate the mode produced by the defect.

In analogy with the total internal reflection optical waveguide, the defect acts as the waveguide core and the photonic band-gap crystal acts as the clad. However, the mechanism of the waveguide allows the core to have a very low refractive index thus realizing the benefits of low attenuation and small nonlinear coefficient.

Because of the potential benefits provided by a photonic band-gap crystal waveguide, there is a need to identify effective, low cost methods of making the photonic band-gap crystal waveguide that are tailored for use in a manufacturing operation.

One such method includes the steps of making a preform having a plurality of longitudinal passages, etching the passages to reach a desired preform geometry, and then drawing the preform into a photonic band-gap crystal waveguide fiber. Improving etching efficiency and performance of the waveguide made from the etched structure is, therefore, a primary enabling step presently under study.

SUMMARY OF THE INVENTION

One aspect of the present invention is a method of making a photonic crystal waveguide fiber preform using an assembly of a first and a second plurality of tubes. A first portion of the photonic crystal is made using a first plurality of tubes which have varying wall thickness along the circumference of the tube, where the circumference lies in a plane perpendicular to the length of the tube. It is understood that the wall thickness does not vary along the length of the tube. In assembling the tubes of this first portion of the photonic crystal, the thinner wall portions of the tubes abut one another. The second portion, i.e., the remaining portion, of the crystal is assembled using a second plurality of tubes which have a substantially constant wall thickness. The second plurality of tubes is configured to surround the first plurality of tubes. The photonic crystal so assembled is then etched until the portion of the photonic crystal where the thin walls abut is removed. Because the first plurality of tubes is assembled contiguously, etching away the wall portions where the thin walls abut has the effect of forming a defect in the photonic crystal. The first plurality of tubes is arranged so that the defect produces, i.e., supports or propagates, light modes having respective wavelengths that lie within the band gap of the photonic crystal.

In an embodiment in accord with the first aspect of the invention, the first plurality of tubes is configured so that the abutting thin walls are located relative to each other such that, if nearest neighbor abutting points are connected by a line, the line is continuous and closes upon itself. In the etching step, all of the tubes inside the continuous, closed line are removed from the photonic crystal. Advantageously the first plurality of tubes can be configured so that the line joining adjacent (nearest neighbor), thin-walled abutting points forms a symmetric geometrical shape such as a circle or a polygon.

In yet another embodiment, each member or certain selected members of the first plurality of tubes has an offset bore. That is, if one takes both the outer tube wall and the inner tube wall as each having respective symmetrical shapes, each having a center point, the two center points are spaced apart from each other. The respective inner and outer walls can be selected from a group consisting of a circle or a polygon. One advantageous choice is a hexagonal shape for the outer wall periphery and a circular shape for the inner wall periphery. The hexagonal shape for the outer wall periphery provides for a close-pack stacking of the tubes, i.e., a stacking with essentially no air gaps. The circular shape for the inner wall periphery is relatively easier to manufacture compared to a polygon shape, although this distinction is less appropriate when describing an extrusion method of making the tubes.

In yet a further embodiment in accord with the first aspect of the invention, the first plurality of tubes has a first composition different from that of the second plurality of tubes. The respective first and second compositions of the two tube types have different etch rates, the first etch rate being greater than the second etch rate. That is, the etching substance removes material of the first composition faster than material of the second composition. In this configuration, shorter etching times can be used in forming the defect in the photonic crystal.

A second aspect of the invention is a method of making a photonic band-gap crystal waveguide fiber. The first steps of this method according to the second aspect of the invention are the same as those set forth above in the first aspect of the invention wherein a photonic crystal preform is made. The additional step in making the photonic band-gap crystal waveguide fiber is to reduce the cross section of the preform until the desired diameter of the waveguide fiber is reached. This diameter reduction of the preform can be carried out using any of several techniques know in the art such as, heating and drawing the preform. As an alternative the preform can be heated and forced through a series of reducing dies. A combination of reducing dies and drawing can be used to achieve the desired diameter of the photonic band-gap crystal waveguide fiber. These techniques are described in detail in many patents and publications and will not be discussed further here.

In an embodiment of this aspect of the invention, the photonic band-gap crystal waveguide fiber has a defect which is symmetric about a center point. The symmetry of the defect in the waveguide fiber stems in large part from the symmetry of the defect in the preform achieved in the assembling and etching steps. The symmetry of the defect, which is understood to include an inner wall periphery substantially free of sharp inward projections, provides for reduced light scattering, and more uniform mode power distribution across the photonic band-gap crystal defect. Because the defect in this embodiment is a void, the defect has a lower non-linear coefficient as well. As is known in the art, the defect in the photonic band-gap crystal waveguide fiber acts as the core region, in analogy with the optical waveguide fiber based upon the principle of total internal reflection. Likewise, the photonic band-gap crystal surrounding the defect serves to confine the light mode and so is analogous to the clad of the total internal reflection type optical waveguide fiber. The modes supported by the defect have respective wavelengths $\lambda$ that lie within the band-gap of the photonic crystal.

An embodiment of the photonic band-gap crystal waveguide fiber exhibits a periphery having a regular shape. A measure of the regularity of the defect periphery can be made by comparing the relative distance between pairs of opposing points. Opposing points are points on the periphery that are located across from one another in the sense that the angle swept out in moving from one point to the other point is 180°. In this embodiment, the shortest and longest distance between pair of opposing points differ by an amount equal to about a wavelength, $\lambda$, of the modes supported.

A third aspect of the invention is a method of making a photonic crystal waveguide fiber preform that includes the step of forming a photonic crystal having a plurality of openings separated from each other by walls. The openings extend through the photonic crystal. The walls are etched to enlarge the openings. One group of openings of the plurality of openings forms a contiguous group and has a first composition that exhibits a first etching rate. A second group of openings, essentially the remainder of the plurality, surround the first group and has a second composition that exhibits a second etch rate. The first etch rate is greater than the second etch rate so that more material is removed from the first group of openings during the etching step. The etching step thus provides a defect in the photonic band-gap crystal which can be configured to support a desired light mode (electromagnetic mode).

In an embodiment of this third aspect, respective the first and second groups of openings are formed by assembling tubes having respective first and second compositions.

In a further embodiment of this third aspect, the photonic crystal is extruded. Methods of extruding objects having a first volume of a first composition and a second volume of a second composition are known in the art. For example, a slug having a first material centrally located and a second material surrounding the first material can be forced through a die to make the photonic band-gap crystal in accord with this embodiment of the third aspect of the invention.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
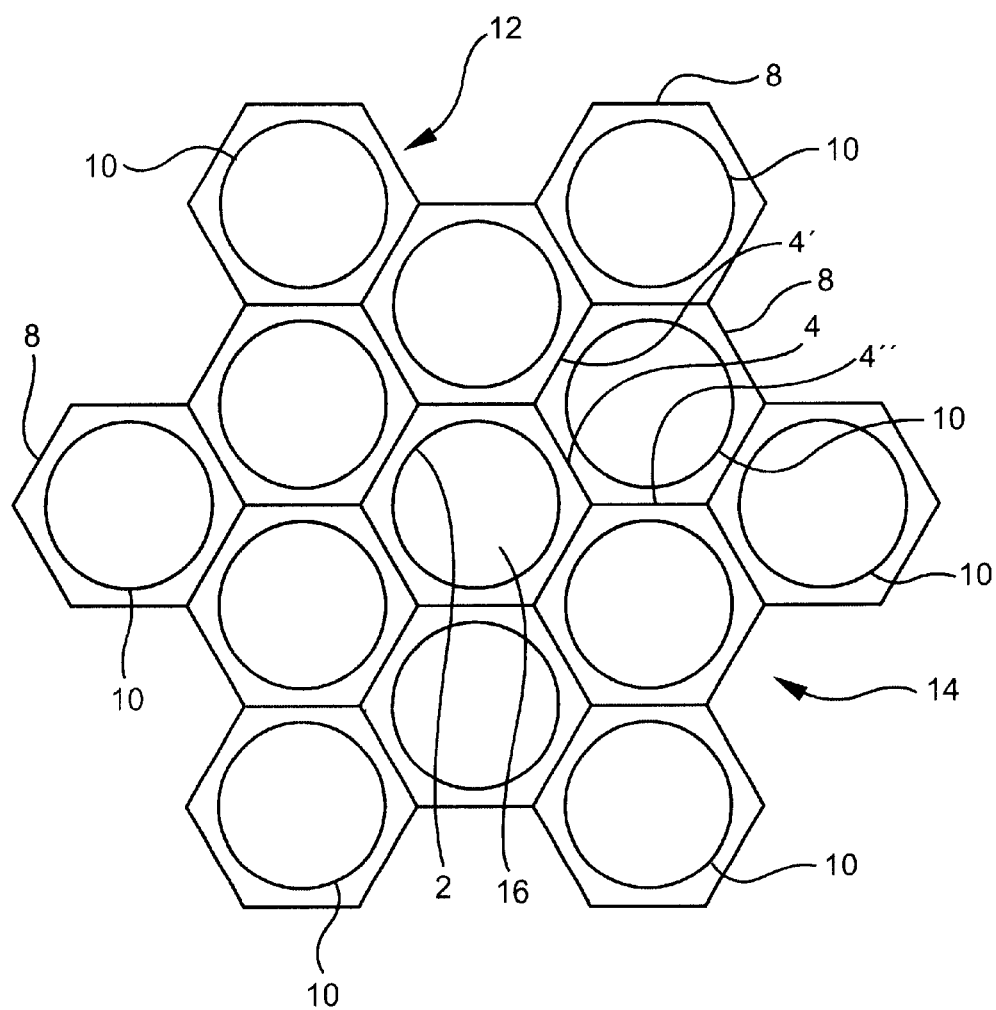
FIG. 1 is an illustration of an assembly of tubes in accord with the invention, prior to the etching step.

Reference will now be made in detail to the present preferred embodiments of the invention, an example of which is illustrated in the accompanying drawings. Wherever possible, the same reference numbers will be used throughout the drawings to refer to the same or like parts. An exemplary embodiment of the photonic band-gap crystal waveguide preform of the present invention is shown in FIG. 1. Tubes 12 and 14 have a hexagonal shaped outer periphery and circular shaped inner periphery 10. Tubes 12 and 14 are assembled in a hexagonal close packed structure, i.e., there are essentially no air spaces between abutting edges of the tubes. The tubes 14 in the inner part of the assembly are asymmetric in that the center point of the circle defined by of inner periphery 10 is offset from the center of the hexagon defined by hexagonal outer periphery 8. Tubes 12 (only six tubes shown) represent the plurality of tubes surrounding tubes 14 and are symmetric in that the center of the circle defined by periphery 10 substantially coincides with the hexagon defined by periphery 8.

Because of the asymmetry of tubes 14, three thin walled portions, 4, 4', and 4", of each of tubes 14 are formed. By placing the center thin wall 4 facing into the central portion 16 of the photonic crystal, the thin walls 4' of nearest neighbor tubes 14 abut one another as do the thin walls 4" of nearest neighbor tubes 14. During the etching step, the respective thin walls 4 of tubes 14 will be removed first. The next walls to be removed will be the respective sets of abutting walls 4' and 4" of tubes 14. In this embodiment, the walls of each of the plurality of tubes 12 and 14 are formed from the same, substantially homogeneous material so that the etching rate is the same for each of the walls. While a number of dielectric materials can be used as material for the walls, a silica based glass is an advantageous choice of wall material. The removal of these walls serves to form the defect in the photonic band-gap crystal which ultimately supports the desired modes in the photonic band-gap crystal waveguide fiber made from the photonic crystal preform.

In forming the photonic crystal preform, the etching step serves two purposes in this embodiment of the method in accord with the invention. In addition to forming the defect in the photonic crystal, the etching of symmetric tubes 12 enlarges the circular periphery 10, thereby increasing the fraction of the photonic crystal volume which is a void, that is, the void fraction. Increasing void fraction can provide for an advantageous change in the performance of the photonic band-gap crystal waveguide. For example, fraction of mode power confined to the defect can increase with increasing void fraction. It will be understood that void as used in describing a photonic crystal refers to pores that may be evacuated or air-filled.

In assembling the photonic crystal of FIG. 1, the central portion 16 can result from leaving out a tube. As an alternative, a thin walled tube 2 can be used as a spacing member in the central portion 16. The tube can be removed after assembling the plurality of tubes to form the preform or the tube can be left in place and etched away during the etching step. Alternative fixtures and jigs can be used to form the central portion 16 of the plurality of tubes 12 and 14.

Figure 2:
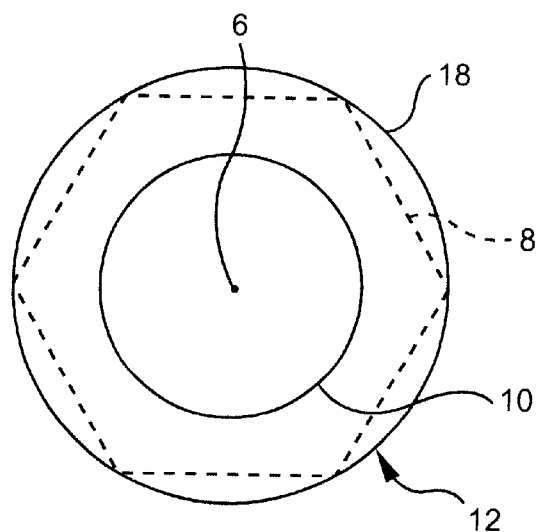
FIG. 2 is an illustration of a symmetric tube for use in assembling a photonic crystal preform.

Two embodiments illustrative of symmetric tubes 12 are shown in FIG. 2. In a first embodiment, the inner periphery 10 defines the perimeter of a circle having center point 6. The outer periphery 8 defines a hexagon having center 6. The respective centers 6 of the circle having perimeter 10 and the hexagon having periphery 8 coincide to form the symmetric tubes 12. In a second embodiment, the inner periphery 10 is again the perimeter of a circle. The outer periphery 18 defines a larger circle. The respective centers 6 of the circle having perimeter 10 and the circle having perimeter 18 coincide to form symmetric tubes 12.

Figure 3:
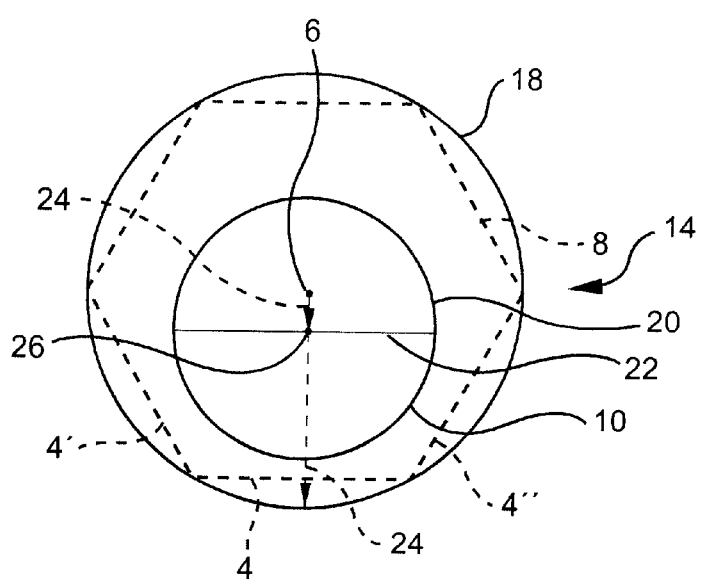
FIG. 3 is an illustration of an asymmetric tube for use in assembling a photonic crystal preform.

Two embodiments illustrative of asymmetric tubes 14 are shown in FIG. 3. In a first embodiment, the inner periphery 20 has an elliptical shape, having its major axis 22 perpendicular to the direction of displacement 24. The outer periphery defines hexagon 8. The geometrical center 26 of the elliptical shape is displaced from the center 6 of the hexagon. Major axis 22 is aligned parallel with one side of the hexagon defined by periphery 8 so that the displacement of center 26 from center 6 results in the formation of three thin wall, 4, 4', and 4".

In a second embodiment, the inner periphery 20 again defines an elliptical shape. The outer periphery 18 is the perimeter of a circle having center 6. The center 6 of the circle having perimeter 18 is displaced relative to the center 26 of the elliptical shape. Because of the circular symmetry of the outer periphery, the direction of the displacement need not be described, in this second embodiment. However, it will be understood that in assembling tubes in accord with the second embodiment, the center of the thin walled portion of a tube 14 should be substantially diametrically opposite a corresponding tube 14. This configuration provides for the etching away of the desired portion of the photonic crystal in the etching step.

Figure 4:
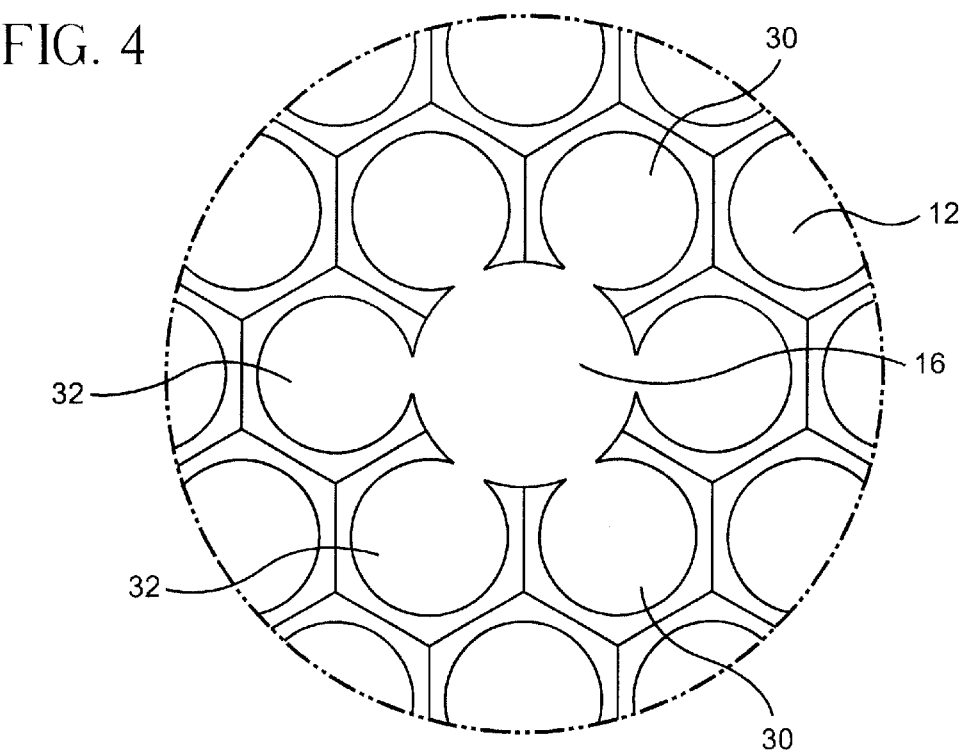
FIG. 4 is an illustration of a photonic crystal assembly using symmetric tubes or an extruded photonic crystal body after the etching step.
Figure 5:
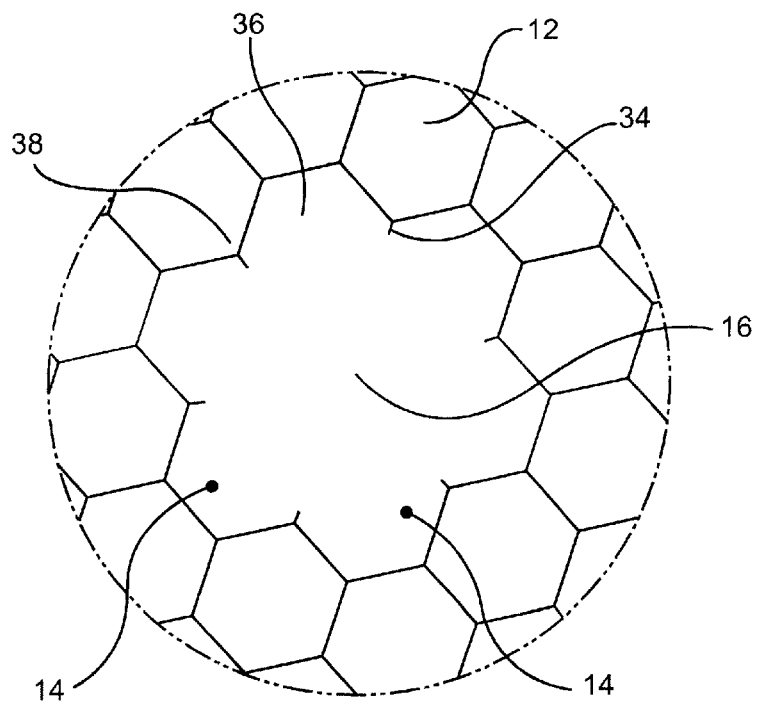
FIG. 5 is an illustration of a photonic crystal assembly using asymmetric tubes surrounded by symmetric tubes or an extruded photonic crystal body after the etching step.

The benefit resulting from use of the asymmetric tubes in a central region of the photonic crystal can be seen by comparing FIGS. 4 and 5. FIGS. 4 and 5 are illustrations of the defect 16 in the photonic crystal together with several of the symmetric tubes 12 surrounding the defect 16. FIG. 4 depicts a photonic crystal preform after the etching step where the preform was assembled using a plurality of symmetric tubes only. The large protrusions 30 extend into the defect 16, forming an irregular surface which can be expected to scatter light propagating in the defect. During the drawing step, the preform is heated to soften the material of the walls and stretched using the several apparatuses and methods known in the art. The wall material is advantageously selected to be a silica based glass, although other glasses or crystalline dielectric material can be used. The surface tension of the softened wall material will cause the protrusions to thin and recede from the center of defect 16. Also the arc shaped voids 32 will partially fill due to surface tension. However, because the protrusion 30 and voids 32 are pronounced, the defect surface in the photonic band-gap crystal waveguide fiber after drawing will still be quite irregular.

In contrast, the photonic crystal preform depicted in FIG. 5 is assembled using asymmetric tubes 14 in a central portion of the photonic crystal in accord with the invention. After the etching step, the abutting thin walls have been etched away leaving the small protrusions 34 and void indentations 36. During the drawing step the small protrusions 34 will essentially disappear, being pulled back into the wall material by surface tension. Also the inward pointing angular projections 38 of the surrounding hexagons, and the outward pointing projections 36 of the surrounding hexagons will be smoothed during the drawing step to produce a photonic band-gap crystal waveguide fiber having a defect surface which is smooth and nearly circular. The smooth, nearly circular defect surface that results from drawing the etched preform of FIG. 5 produces a greatly reduced amount of light scattering in comparison to the defect depicted in FIG. 4.

The defect 16 depicted in FIG. 5 can also be achieved using symmetric tubes, for example similar to tubes 12, but made from a material having a higher etching rate than tubes 12.

A further alternative method of achieving a preform in accord with the invention and as depicted in FIG. 5 is to extrude the preform using a material in the defect region 16 which has a higher etching rate than the material used to make the portion of the photonic crystal surrounding the defect portion.

It will be understood that other combinations of tube structure or composition can be used to provide a region of a photonic crystal that is preferentially etched away. For example, the tubes making up the defect region 16 could simply be thin walled tubes of essentially any inner and outer geometrical shape.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

I claim:

1. A method of making a photonic crystal waveguide fiber preform comprising the steps:
   a) assembling into a bundle a first plurality of tubes to form a first portion of a photonic crystal, a group of tubes of said first plurality of tubes having a wall thickness which varies along the tube circumference to provide thinner and thicker wall portions of the tubes of the group, wherein, said first plurality of tubes is assembled into said bundle so that thinner wall portions of neighboring tubes abut one another;
   b) assembling a second plurality of tubes about said bundle to form a second portion of the photonic crystal, each of the second plurality of tubes having a substantially uniform wall thickness;
   c) etching the walls of said first and second plurality of tubes to etch away the abutting thinner wall portions to form a defect in the photonic crystal.

2. The method of claim 1 wherein each of said first and second plurality of tubes has a long axis and, in a cross sectional plane through said photonic crystal perpendicular to the long axes of the tubes, a line, connecting points whereat thinner wall portions of neighboring tubes abut one another, is continuous and closes upon itself.

3. The method of claim 2 wherein said line connecting points forms a substantially symmetrical geometrical shape.

4. The method of claim 3 wherein the regular geometrical shape is selected from a group consisting of a circle and a polygon.

5. The method of claim 1 wherein each of the tubes of the group of tubes of said first plurality of tubes is characterized by an outer wall periphery having a center and an inner wall periphery having a center, and the outer wall center is spaced apart from the inner wall center.

6. The method of claim 5 wherein the respective outer wall periphery and inner wall periphery are selected from a group consisting of a circle and a polygon.

7. The method of claim 6 wherein the outer wall periphery is a hexagon and the inner wall periphery is a circle.

8. The method of claim 1 wherein said first plurality of tubes has a first composition having a first etch rate and said second plurality of tubes has a second composition having a second etch rate, and the first etch rate is greater than the second etch rate.

9. A method of making a photonic band-gap crystal waveguide fiber comprising the steps:
   a) assembling into a bundle a first plurality of tubes to form a first portion of a photonic crystal, a group of tubes of said first plurality of tubes having a wall thickness which varies along the tube circumference to provide thinner and thicker wall portions of the tubes of the group, wherein, said first plurality of tubes is assembled into said bundle so that thinner wall portions of neighboring tubes abut one another;
   b) assembling a second plurality of tubes about said bundle to form a second portion of the photonic crystal, each of the second plurality of tubes having a substantially uniform wall thickness;
   c) etching the walls of said first and second plurality of tubes to etch away the abutting thinner wall portions to form a defect in the photonic crystal, said first and second plurality of tubes each having a long axis, and, said photonic crystal having a cross section perpendicular to the long axis; and,
   d) after step c) reducing in area a cross section of said photonic crystal, wherein the cross section is perpendicular to the long axes of each of the first and second plurality of tubes, to form a waveguide fiber.

10. The method of claim 9 wherein after step d) the periphery of the defect in the photonic crystal is symmetric about a center point.

11. The method of claim 10 wherein light of wavelength $\lambda$ propagates in the defect and the difference between the shortest distance between two opposing points on the periphery and the longest distance between two opposing points on the periphery is about equal to $\lambda$.

12. A method of making a photonic crystal waveguide fiber preform comprising the steps:
   a) forming a photonic crystal having a plurality of openings, separated one from another by walls, extending from a first to a second end of said photonic crystal;
   b) etching the walls to remove material therefrom; wherein,
      the plurality of openings is divided into a first and a second group, each said group having walls, said first group being contiguous and surrounded by said second group, and having walls of a first composition characterized by a first etch rate, said second group having walls of a second composition characterized by a second etch rate, wherein the first etch rate is greater than the second etch rate.

13. The method of claim 12 wherein said respective first and second group of openings having walls comprise respective first and second type of tube.

14. The method of claim 13 wherein said photonic crystal is an extruded body.

\* \* \* \* \*